United States Patent [19]

Felder

[11] Patent Number: 4,544,064
[45] Date of Patent: Oct. 1, 1985

[54] DISTRIBUTION INSTALLATION FOR MOVING PIECE GOODS

[75] Inventor: Christian Felder, Dreieichenhain, Fed. Rep. of Germany

[73] Assignee: Gebhardt Fordertechnik GmbH, Fed. Rep. of Germany

[21] Appl. No.: 463,319

[22] Filed: Feb. 2, 1983

[30] Foreign Application Priority Data

Feb. 5, 1982 [DE] Fed. Rep. of Germany ....... 3204021

[51] Int. Cl.$^4$ ........................... B07C 3/10; G06K 9/34
[52] U.S. Cl. ..................................... 209/583; 235/471; 382/48; 382/61
[58] Field of Search .................................. 209/3.1-3.3, 209/583; 235/470, 471, 462; 382/61, 36, 48; 250/566

[56] References Cited

U.S. PATENT DOCUMENTS

| | | | |
|---|---|---|---|
| 3,550,770 | 12/1970 | Lund et al. | 209/583 |
| 3,645,391 | 2/1972 | Hirakawa et al. | 209/583 X |
| 3,801,775 | 4/1974 | Acker | 235/471 X |
| 3,847,346 | 11/1974 | Dolch | 382/61 |
| 3,902,047 | 8/1975 | Tyler et al. | 235/471 |
| 4,403,339 | 9/1983 | Wevelsiep et al. | 382/61 X |
| 4,424,587 | 1/1984 | Wevelsiep et al. | 382/61 X |
| 4,424,588 | 1/1984 | Satoh et al. | 382/48 |

Primary Examiner—Robert B. Reeves
Assistant Examiner—Edward M. Wacyra
Attorney, Agent, or Firm—Craig and Burns

[57] ABSTRACT

A distribution installation for piece goods moved on a conveyor track which are distributed from a common feed conveyor to several stations of a distribution conveyor; each piece good is provided for that purpose with a coding containing an information which is detected or scanned within the area of an objective field of a scanning station arranged upstream of the distribution conveyor by a video camera connected to an electrical evaluation circuit in order to determine an exit information; to speed up and simplify the distribution, the video camera is arranged vertically above the detection station and each piece good is moved through the objective field non-oriented in the transverse direction and angularly independent about the vertical axis with a coding disposed at the top thereof which consists of a single bar group or the like whose precise detection for position and content is made possible by positioning bars and is thus reduced to a short period of time; the detection efficiency is thus unequivocal and numerically high.

23 Claims, 6 Drawing Figures

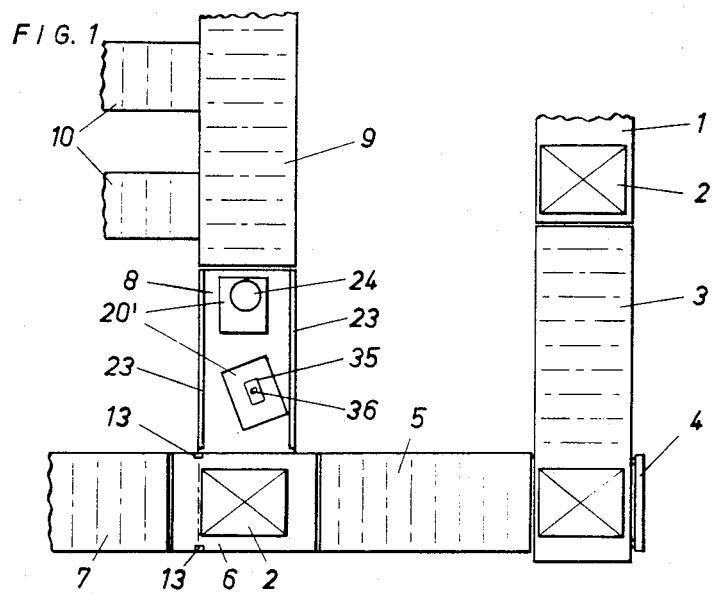
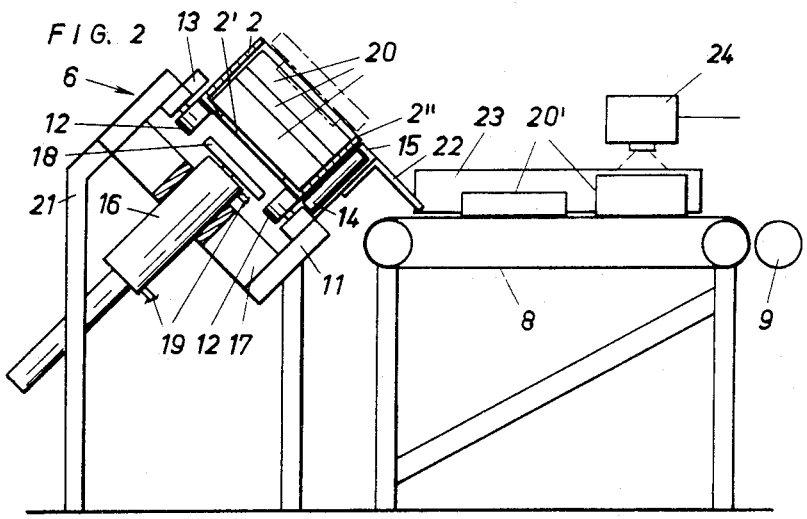

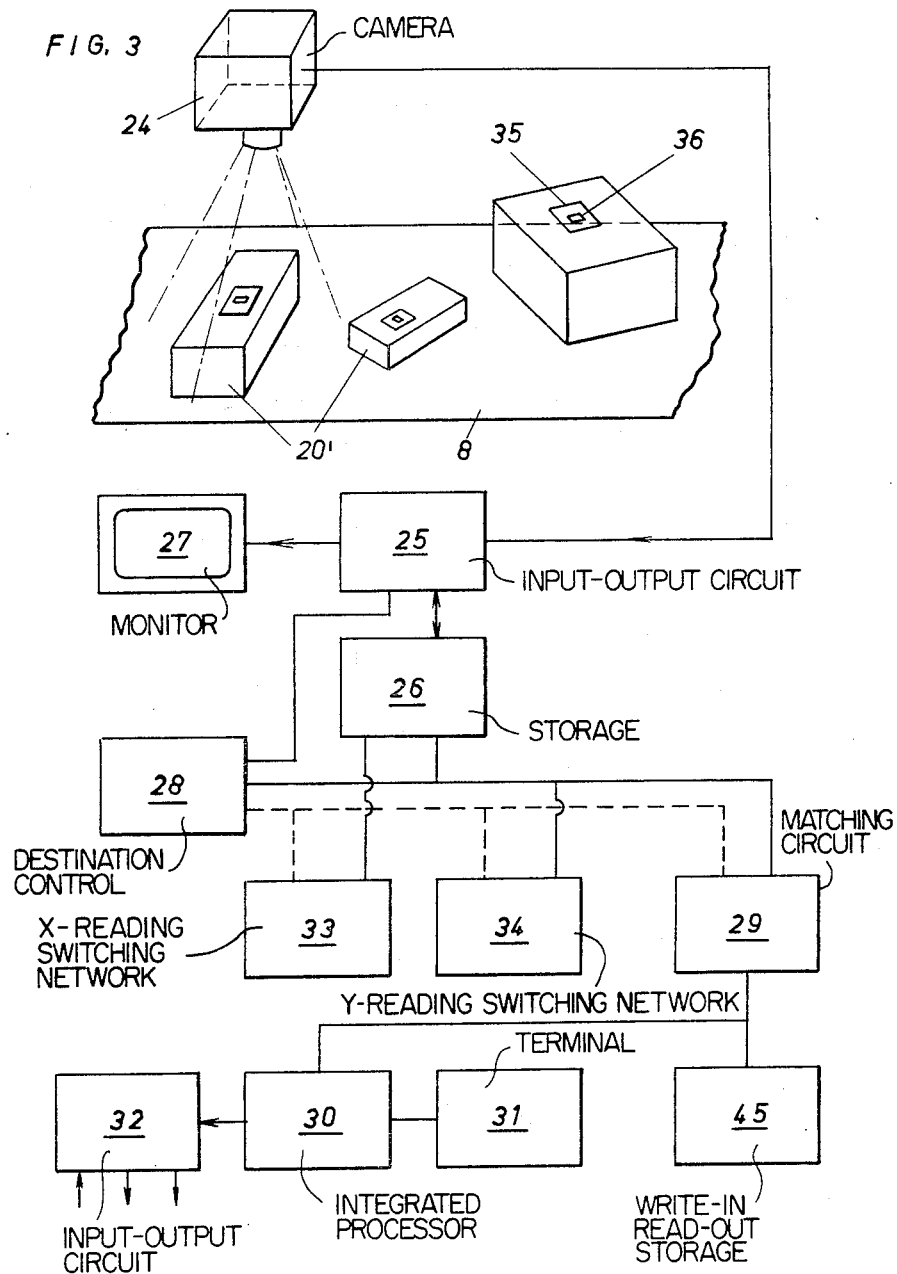

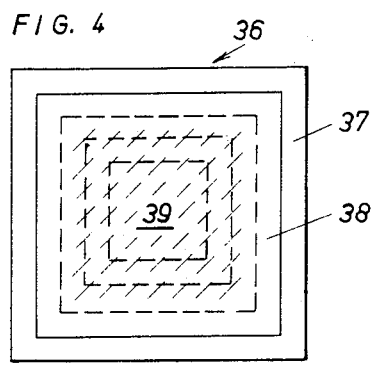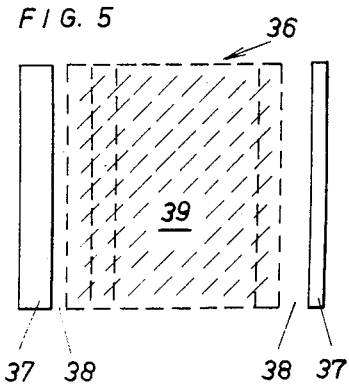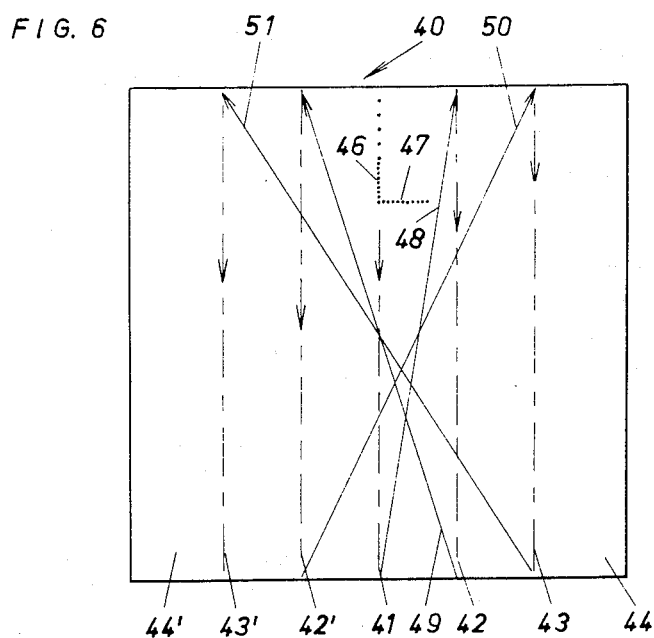

DISTRIBUTION INSTALLATION FOR MOVING PIECE GOODS

The present invention relates to a distribution installation for piece goods moved on a conveyor track, which are distributed from a common feed track to several stations of a distributor track, whereby each piece good is provided with a coding containing an information, which is detected or scanned contactlessly within the area of an objective field of a detection or scanning station connected ahead of the distribution track by means of a video camera connected to an electrical evaluating circuit in order to determine the outlet or exit information belonging to the associated station of the distribution conveyor.

An installation for the optical detection or scanning of informations on conveyed objects is disclosed in the German Offenlegungsschrift No. 1774490, in which the objects are guided non-oriented past a video camera. The coding present in the objective field of the video camera is thereby read and converted with the aid of an evaluating circuit into an outlet information. The coding thereby consists of a group of parallel bars which are scanned or detected at an angle disposed between 90° and 45° to the bar direction. In order to achieve also a detection or scanning between 0° and 45°, the coding must be formed of two identical groups of parallel bars, whereby the bars of one group subtend an angle of 90° to the bars of the other group. The objects must therefore be guided past the video camera either roughly oriented within the angular range of 90° to 45° or must be provided with a double coding. The former requires correcting means for the transverse guidance and presupposes an angularly correct feed. The latter, in contrast thereto, necessitates a double coding which requires a greater expenditure of time both for the manufacturer as also for the evaluation, as a result of which the detection performance and efficiency is necessarily reduced.

Accordingly, the object of the present invention is an improved distribution system, in which a simple coding can be scanned or detected completely independently of the angular position and a high detection efficiency can be achieved thereby.

The underlying problems are solved according to the present invention in that the video camera is directed perpendicularly from above onto the conveyor plane of the detection station, in that each piece good is conveyed through the objective field of the video camera both non-aligned in the transverse direction within the objective field and also angularly independently about the vertical axis and with an upwardly facing coding and in that the coding consists of a single bar group or the like containing the information, to which is coordinated at least one positioning bar, whereby the angular position of the coding can be determined from the scanning of the positioning bar and thereafter the coding can be evaluated therefrom in order to determine the outlet or exit information for forwarding the given piece good to the coordinated station of the distribution track.

The advantages achieved with the present invention reside in particular in that as a result of the particular configuration of the coding, the location and position thereof can be determined unequivocally, rapidly and simply, and more particularly independently of the angular position perpendicular with respect to the conveying plane. The coding may therefore be equipped in a simple manner with a single bar group or line group which is to be scanned for the information determination. Both for the manufacture of the coding and also the detection or scanning thereof, only short periods of time are thus required. The piece goods to be sorted can therefore be guided through the objective field of the video camera in close sequence so that a high hourly output can be achieved. The distribution installation according to the present invention is therefore particularly suited for application with systems for combining deliveries or the like for different destinations with piece goods different in their spatial shape.

These and other objects, features and advantages of the present invention will become more apparent from the following description when taken in connection with the accompanying drawing which shows, for purposes of illustration only, one embodiment in accordance with the present invention, and wherein:

FIG. 1 is a somewhat schematic plan view of the distribution installation for piece goods in accordance with the present invention;

FIG. 2 is a somewhat schematic cross-sectional view through the delivery station;

FIG. 3 is a schematic block diagram of the detection station with evaluating circuit in accordance with the present invention;

FIG. 4 is a view of a first embodiment of a coding in accordance with the present invention;

FIG. 5 is a view of a modified embodiment of a coding in accordance with the present invention; and FIG. 6 is a schematic view of the objective field of the video camera for use with the installation of the present invention.

Referring now to the drawing wherein like reference numerals are used throughout the various views to designate like parts, the distribution installation for packages, bundles or similar piece goods includes according to FIG. 1 a feed conveyor track 1, on which are fed stacked piece goods placed one above the other, for example, in containers 2. The piece goods themselves may be different in size and shape and are provided at the top thereof with a label 35 having a coding. The label 35 is printed, for example, by a matrix printer with a coding and a plain language text and is then affixed to the piece good, in particular, is glued onto the same. A non-driven deceleration conveyor 3 adjoins the feed conveyor track 1, constructed in any suitable known manner, whereby the end of the conveyor 3 is constructed as transverse conveyor 4. The latter terminates in a roller track 5 with driven rollers which is adjoined by a discharge station generally designated by reference numeral 6. An empty container conveyor 7 is connected to the discharge arrangement 6 in the conveying direction of the roller track 5 whereas a belt conveyor 8 is provided in the discharge direction at the discharge station 6, which is adjoined by a distribution track 9 having several laterally branching-off stations 10, into which the coordinated piece goods are deflected by conventional diverters or the like (not shown). Of course, the distribution installation may also be constructed in another manner adapted to the local conditions and/or the type of the piece goods.

Thus, for example, according to FIG. 2, for purposes of emptying the containers 2, the roller track 5 arranged horizontally in the usual manner, passes over continuously into a position inclined in the discharge direction towards the piece goods conveyor 8, which adjoins in a similar inclined position the discharge station generally designated by reference numeral 6. The discharge station 6 includes a frame 11 inclined by about 45°, in which is supported a conveyor track 12 including rollers for the container conveyance, the conveyor track 12 being driven in a conventional manner (not shown). As soon as the containers 2 have reached the discharge location, the drive is disengaged by interruption of a light barrier 13 or of a corresponding positioning device. Rollers 14 mounted in the side wall plane prevent the containers 2 from sliding off in the inclined direction; the rollers 14 are thereby rotatably supported in a bracket-like support 15 mounted on the frame 11. An actuating cylinder 16 actuated by an auxiliary force is secured at the frame 11 centrally below the container 2, and disposed at the discharge location by a web 17; the piston rod of the actuating cylinder 16 thereby carries a plunger 18. The pressure medium is fed and discharged to the cylinder 16 by way of lines 19 so that the plunger 18 can be displaced upwardly or downwardly. The bottom of the container 2 disposed above the plunger 18 is provided with an aperture 2', through which the plunger 18 can enter into the container 2 and thereby lift the piece good 20 stored therein. The frame 11 of the discharge station 6 rests on a frame structure 21 so that a slide 22 secured at the support 15 somewhat below the upper edge 2" of the container 2 terminates closely above the piece goods conveyor 8 in the discharge position. Laterally affixed guide boards 23 on the conveyor 8 assure that the discharged piece goods 20' are conveyed through the objective field of a video camera 24 fixed above the piece goods conveyor 8 and disposed generally perpendicularly to the conveyor plane thereof. It is apparent that the discharge of the piece goods 20 takes place sequentially so that they travel in a column one behind the other underneath the video camera 24.

The video camera 24 is equipped according to FIG. 3 with a lens having a large depth of field in order to compensate for height differences between different piece goods 20' of, for example, 40 cm. Inclined pictures up to about 20° will still produce information to permit evaluating results. Of course, the objective field disposed underneath the video camera 24 is illuminated uniformly and well in order to obtain clear pictures, especially also with an inclined position and/or under transparent foils. The video camera 24 is connected with a storage device 26 by way of an input/output circuit 25. The picture information transmitted to the storage device 26 may be monitored with the aid of a monitor 27. The destination control includes a control device 28 fed by the input/output circuit 25 which, in turn, supplies signals by way of a matching circuit 29 to an integrated μ-processor 30 and to a write-in/read-out storage device 45. The microprocessor is operatively connected with a terminal 31 and with an output circuit 32 which serves at the same time as input for the starting pulse. Additionally, conventional switching networks for the X-reading 33 and the Y-reading 34 are provided between the control device 28 and the matching circuit 29. Since the electronic circuits schematically indicated in the block diagram in FIG. 3 involve individually known devices commercially available, a detailed description thereof is dispensed with herein.

Each piece good 20,20' carries a label 35 provided with a coding 36 which is disposed at the top with respect to the conveyance, i.e., faces upwardly so that it can be detected in the objective field of the video camera 24. The coding 36 printed on this label 35 has, according to FIGS. 4 and 5, a square or rectangular coding area, along the edge of which are provided positioning bars 37 which are separated by a gap 38 from the bar group 39 containing the information. The latter include in a known manner of a more or less large number of parallel, respectively, concentric bars which are arranged adjacent one another with or without spacing. The bar group 39 may be laid out as a closed square according to FIG. 4 or also as a parallel bar group as shown in FIG. 5. However, a circularly shaped lay-out is also within the scope of the present invention. One positioning bar 37 is arranged at an edge or also at oppositely disposed edges of this bar group 39 so that the outer circumference of the coding always forms a square. The positioning bar 37 has a width of at least 3 to a maximum of 10 image points.

The objective field 40 to be scanned by the video camera 24 is optically subdivided according to FIG. 6 into search gaps by parallel search lines parallel to the conveying direction, i.e., in the Y-direction of the piece good 20', whereby search lines 42 and 42' are provided symmetrically on both sides of a center search line 41, for example, at a distance of 80 image points therefrom, and further outwardly additional search lines 43 and 43' are provided at the same distance. An edge 44 and 44' not to be scanned, for example, having a width of 96 image points is provided outwardly thereof on both sides. The searching operation commences at the forward end of the objective field 40 at the center search line 41 with an image point sequence 46 switched to jump circuit so that, for example, only each third image point is detected. Dark-light transitions are not registered thereby. If, in contrast thereto, a light-dark transition takes place, then the circuit switches immediately to a direct image point sequence, i.e., to the detection of each image point, and more particularly up to a maximum of ten image points following one another. If no dark-light transition is detected by the tenth image point, then the search is continued at right angle toward the right, i.e., in the X-direction also up to ten image points 47, one after the other. If also then no dark-light transition takes place, the search will jump back to the center search line 41 and will be continued jump-wise in the manner described. After reaching the end of the center search line, the search is continued according to arrow 48 at the forward end of the right search line 42 in order to jump from the same onto the adjacent left search line 42' according to arrow 49, then onto the outer right search line 43 according to arrow 50 and finally onto the left outer search line 43' according to arrow 51.

If after the switching-over of the search operation to detect each image point a dark-light transition is found, then the coding 36 is localized. For purposes of determining the position, the foremost corner point of the coding as viewed in the conveyance direction is thereafter determined and subsequently thereto the rearmost corner point and thereafter a line is placed through both corner points, in the center of which necessarily lies the center point of the coding 36. For purposes of evaluating the bar group 39, an intersecting line is then placed through the center point of the coding 36 in parallel to the search lines 41 to 43, which contains the scanning scale of the intersected code roster. Since circuits which are able to automatically perform the search and scanning functions described above are known as such in the art, a detailed description thereof is dispensed with herein for the sake of clarity, i.e., the separate circuits and not the arrangement of these circuits is acknowledged as being known in the art.

It is apparent that as a result of the operations described above for searching and determining the position of the coding 36, the piece goods 20' can be conveyed through the objective field 40 of the video camera 24 in a non-oriented manner, in particular with an angular position completely independently about the vertical axis, i.e., practically chaotically, whereby a safe information determination takes place. From the latter, the coordinated station 10 of the distribution track 9 is then determined by a computer or storage device and the piece good 20' is exited into this station 10.

Of course, in lieu of the separately printed bar group 39 on the label 35, the plain language printing may also be used directly as information carrier. Since the plain language writing in the form of letters also represents a group of bars by reason of the line-shaped distribution, the same can be read in the manner described above and can be coordinated by picture comparison to the predetermined station 10.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A distribution installation for piece goods moved along a conveyor track which are distributed from a common feed track to several stations of a distribution track, each piece good being provided with a coding containing an information which is contactlessly detected within the area of an objective field of a detection station located upstream of the distribution track by a video camera means connected to an electrical evaluating circuit means for determining the exit information belonging to an associated station of the distribution track, said video camera means being directed from above and substantially perpendicularly onto the conveyor track plane of the detection station, each said piece good being conveyed through the objective field of the video camera means in a non-oriented manner in the transverse direction and angularly independently about the vertical axis with an upwardly facing coding within the objective field, the coding including a single bar group containing the information, the bar group including at least one positioning bar means utilized for determining the angular position of the coding when detected at said detection station, said circuit means evaluating the coding subsequent to detection of the orientation of the positioning bar means in order to determine the exit information and subsequent further transmittal of the respective piece good to the coordinated station of the distribution track, the search operation for searching the coding inside of the objective field being so constructed that image points are initially examined for a predetermined length of time on a center search line parallel the conveyance direction and subsequently alternately on right and left search lines disposed laterally adjacent the center search line until a light-dark transition takes place, upon said light-dark transition occurring a predetermined number of successive image points in the search direction and thereafter a predetermined number of image points at a right angle to the search line are examined until a dark-light transition is detected.

2. A distribution installation according to claim 1, wherein the coding is arranged on a rectangular area, inside of which are arranged the bar group containing the information and the positioning bar means, the bar group and the positioning bar means being separated from one another by a gap.

3. A distribution arrangement according to claim 2, wherein the coding is arranged inside a square area.

4. A distribution installation according to claim 2, wherein a positioning bar means is provided at least at one edge of the coding.

5. A distribution installation according to claim 4, wherein one positioning bar is provided at mutually oppositely disposed edges of the coding.

6. A distribution installation according to claim 4, wherein the objective field detected by the video camera means has an edge length about five times the edge length of the coding.

7. A distribution installation according to claim 6, wherein the objective field is subdivided into several search gaps extending parallelly to one another and to the conveying direction and optically separated by search lines and in that the two outer search lines are provided with a spacing from the outer edge of the objective field by the formation of rims.

8. A distribution installation according to claim 7, wherein the lateral distance of the search lines amounts to about 80 image points and the width of the rims to about 96 image points.

9. A distribution installation according to claim 8, wherein the subsequent search operation includes the placement of about ten successive image points in the search direction and thereafter up to ten successive image points at a right angle toward the right until a dark-light transition is detected.

10. A distribution installation according to claim 9, wherein for purposes of determining the position of the coding the foremost corner point and subsequently the rearmost corner point is searched for and the center point of the coding is then determined by determining the center between the two end points.

11. A distribution installation according to claim 10, wherein for evaluating the coding, an intersecting line disposed parallel to the search lines is placed through the center point of the coding which has the scale of the intersected coding.

12. A distribution installation according to claim 11, wherein the bar group of the coding includes plain language lines of the address.

13. A distribution installation according to claim 1, wherein the objective field is subdivided into several search gaps extending parallelly to one another and to the conveying direction and optically separated by search lines and in that the two outer search lines are provided with a spacing from the outer edge of the objective field by the formation of rims.

14. A distribution installation according to claim 13, wherein the lateral distance of the search lines amounts to about 80 image points and the width of the rims to about 96 image points.

15. A distribution installation according to claim 13, wherein the subsequent search operation includes the placement of about ten successive image points in the search direction and thereafter up to ten successive image points at a right angle toward the right until a dark-light transition is detected.

16. A distribution installation according to claim 15, wherein for purposes of determining the position of the coding the foremost corner point and subsequently the rearmost corner point is searched for and the center point of the coding is then determined by determining the center between the two end points.

17. A distribution installation according to claim 16, wherein for evaluating the coding, an intersecting line disposed parallel to the search lines is placed through the center point of the coding which has the scale of the intersected coding.

18. A distribution installation according to claim 1, wherein the bar group of the coding includes plain language lines of the address.

19. A distribution installation according to claim 1, wherein the objective field detected by the video camera means has an edge length about five times the edge length of the coding.

20. A distribution installation according to claim 1, wherein a positioning bar means is provided at least at one edge of the coding.

21. A distribution installation according to claim 1, wherein the initially examined image points on the center search line are examined for a predetermined length of time opposite the conveyance direction.

22. A distribution installation according to claim 21, wherein the image points examined at a right angle subsequent to the occurrence of the light-dark transition are at a right angle to the right.

23. A distribution installation according to claim 1, wherein the image points examined at a right angle subsequent to the occurrence of the light-dark transition are at a right angle to the right.

* * * * *